(12) United States Patent
Ido (10) Patent No.: US 9,941,720 B2
(45) Date of Patent: Apr. 10, 2018

(54) LIGHTING DEVICE, ILLUMINATION DEVICE, AND LIGHTING FIXTURE

(71) Applicant: Panasonic Intellectual Property Management Co., Ltd., Osaka (JP)

(72) Inventor: Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 213 days.

(21) Appl. No.: 15/133,571

(22) Filed: Apr. 20, 2016

(65) Prior Publication Data

US 2016/0316534 A1    Oct. 27, 2016

(30) Foreign Application Priority Data

Apr. 24, 2015   (JP) .................. 2015-089574

(51) Int. Cl.
*H02J 7/00*    (2006.01)
*H05B 33/08*    (2006.01)

(52) U.S. Cl.
CPC .......... *H02J 7/0068* (2013.01); *H02J 7/0072* (2013.01); *H05B 33/0803* (2013.01); *H05B 33/083* (2013.01)

(58) Field of Classification Search
CPC .................................................. H02J 7/0068
See application file for complete search history.

(56) References Cited

U.S. PATENT DOCUMENTS

| 7,923,860 B2 * | 4/2011 | Furuse | H02M 1/44 307/14 |
| 8,203,233 B2 * | 6/2012 | Yonehara | H03K 7/08 307/31 |
| 8,994,289 B2 * | 3/2015 | Wey | H05B 33/0815 315/209 R |
| 9,686,833 B2 * | 6/2017 | Bong | H05B 33/0845 |
| 2012/0299495 A1 | 11/2012 | Sakuragi et al. | |

* cited by examiner

*Primary Examiner* — Hai L Nguyen
(74) *Attorney, Agent, or Firm* — Renne Otto Boisselle & Sklar, LLP (57) ABSTRACT

In a lighting device, each of n circuit blocks includes a current controller, a storage element, a charging current controller, a charging rectifier element, and a discharging rectifier element. A first circuit block of the n circuit blocks is configured such that a pulsating voltage generated by rectifying a sine wave AC voltage is applied to the series circuit of the current controller and one light source electrically connected to the first circuit block. An i-th circuit block of the n circuit blocks is electrically connected in parallel to the current controller of an i-1-th circuit block via an i-1-th connection rectifier element.

20 Claims, 10 Drawing Sheets

LIGHTING DEVICE, ILLUMINATION DEVICE, AND LIGHTING FIXTURE

CROSS-REFERENCE TO RELATED APPLICATION

This application claims the benefit of priority of Japanese Patent Application Number 2015-089574, filed on Apr. 24, 2015, the entire contents of which are hereby incorporated by reference.

TECHNICAL FIELD

This present disclosure relates to lighting devices, illumination devices, and lighting fixtures, and more particularly, a lighting device configured to light a solid-state light-emitting element, an illumination device including the lighting device and a light source including a solid-state light-emitting element, and a lighting fixture including the illumination device.

BACKGROUND ART

A light-emitting diode (LED) driving device described in JP 2012-244137 A (hereinafter referred to as Document 1) represents as a conventional example of a lighting device. The light-emitting diode driving device (hereinafter referred to as a conventional example) includes a rectifier circuit, an LED unit, a constant current circuit for charging a capacitor (charging circuit), a constant current circuit for discharging a capacitor (discharging circuit), a charging diode, a discharging diode, and a charging-discharging capacitor. The conventional example is, for example, electrically connected to an AC power supply with an effective value of 100 V, and is configured to rectify an AC voltage of the AC power supply with a rectifier circuit, and to obtain a pulsating voltage with a peak value of approximately 141 V.

A first end of the charging-discharging capacitor and a first end of the discharging circuit are electrically connected to a high potential-side output terminal of the rectifier circuit, and a low potential-side output terminal thereof is electrically connected to ground. An anode of the charging diode and a cathode of the discharging diode are electrically connected to a second end of the charging-discharging capacitor. A cathode of the charging diode is electrically connected to a second end of the discharging circuit and an anode-side terminal of the LED unit. A cathode of the LED unit is electrically connected to an anode of the discharging diode and a first end of the charging circuit. A second end of the charging circuit is electrically connected to ground.

Next, operations of this conventional example will be described.

First, charging of the charging-discharging capacitor is performed for a period during which a power supply voltage of the AC power supply is high. A charging current flows in a path (hereinafter referred to as a charging path) that passes from the rectifier circuit through the charging-discharging capacitor, the charging diode, the LED unit, and the charging circuit in this order, and charges the discharging-discharging capacitor. The charging current is controlled to a constant current by the charging circuit. At this time, the LED unit and the charging-discharging capacitor are connected in series, and loss in the charging circuit can be mitigated due to a charged voltage of the charging-discharging capacitor due to a charged voltage of the charging-discharging capacitor, even if a forward voltage of the LED unit is small and a voltage difference thereof to the power supply voltage is large. Also, the charged voltage of the charging-discharging capacitor is a voltage obtained by subtracting the forward voltage of the LED unit from the power supply voltage at the end of charging. When the charging ends, the current flowing in the charging circuit decreases rapidly, and the discharging circuit starts operation in response to a signal generated when this rapid decrease is detected.

Discharging of the charging-discharging capacitor is performed for a period during which the power supply voltage of the AC power supply is low. The discharge current flows in a path (hereinafter referred to as a discharging path) that passes from the charging-discharging capacitor through the discharging circuit, the LED unit, the discharging diode, and charging-discharging capacitor in this order. Note that the discharge current is controlled to a constant current by the discharging circuit.

Here, a period during which the power supply voltage is higher than the voltage (charged voltage) across the charging-discharging capacitor exists before transitioning from the charging period to the discharging period, and a current flows in the period (hereinafter referred to as a transient period) in a path (hereinafter referred to as a transient path) that passes from the rectifier circuit through the discharging circuit, the LED unit, and the charging-discharging circuit in this order. Note that the current (hereinafter referred to as a transient current) is controlled to a constant current having a current value that is equal to the value of whichever current is smaller between the current in the discharging circuit and the current in the charging circuit (current in the discharging circuit, for example).

According to the conventional example, as described above, the LED unit can be directly driven (lighted) by the pulsating voltage that results from rectification by the rectifier circuit, without the AC electric power supplied from the AC power supply being converted to DC electric power. Moreover, in this conventional example, lighting of the LED unit and charging of the charging-discharging capacitor are performed at the same time by connecting the LED unit and the charging-discharging capacitor in series, for a period during which the pulsating voltage is high, and the LED unit can be lighted by discharging the charging-discharging capacitor for a period during which the pulsating voltage is low. As a result, since there is no period during which the light source (LED unit) is turned off in one cycle of the power supply voltage, flicking can be suppressed.

Incidentally, the conventional example described in Document 1 includes a plurality of LED units connected in series to improve efficiency (power supply efficiency). However, if the number of LED units is increased to improve the efficiency, changing (light ripple) of all light fluxes in one cycle of the pulsating voltage may be increased. Also, if smoothing capacitors are respectively connected in parallel to the plurality of LED units to suppress the light ripple, the cost for manufacturing the lighting device may be increased and the lighting device may be large.

SUMMARY

The present disclosure has been made in view of the above-described problem, and an object of the present disclosure is to improve efficiency without increasing the number of light sources compared with the conventional example.

A lighting device according to an aspect of the present disclosure includes n circuit blocks, where n is a positive integer of 2 or more. The n circuit blocks are electrically connected to n light sources, respectively and configured to light the n light sources. Each of the n circuit blocks includes a current controller, a storage element, a charging current controller, a charging rectifier element, and a discharging rectifier element. The current controller is electrically connected in series to a respective light source of the n light sources. The current controller is configured to control current flowing through the respective light source such that the current does not exceed a predetermined value. The storage element is configured to be discharged with the current flowing through the respective light source. The charging current controller is configured to control current for charging the storage element. The charging rectifier element is inserted between the respective light source and the storage element. The discharging rectifier element is configured to cause current discharged from the storage element to flow through the respective light source. A first circuit block of the n circuit blocks is configured such that a pulsating voltage generated by a sine wave AC voltage being rectified is applied to a series circuit of the current controller and the respective light source that is electrically connected to the first circuit block. For each value of i from 2 to n, where i is a positive integer, an i-th circuit blocks of the n circuit blocks is electrically connected in parallel to the current controller of an i-1-th circuit block of the n circuit blocks via an i-1-th connection rectifier element.

An illumination device according to an aspect of the present disclosure includes n light sources and the lighting device. The n light sources each include one or more solid-light-emitting elements.

An illumination fixture according to an aspect of the present disclosure includes the illumination device and a fixture body holding the illumination device.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Hereinafter, a lighting device, an illumination device, and a lighting fixture according to an embodiment will be described with reference to drawings. Note that the configuration described in the following embodiment is only one example of the present invention, and the present invention is not limited to the following embodiment. Numerous variations are possible without departing from the inventive aspects described herein.

Figure 1:
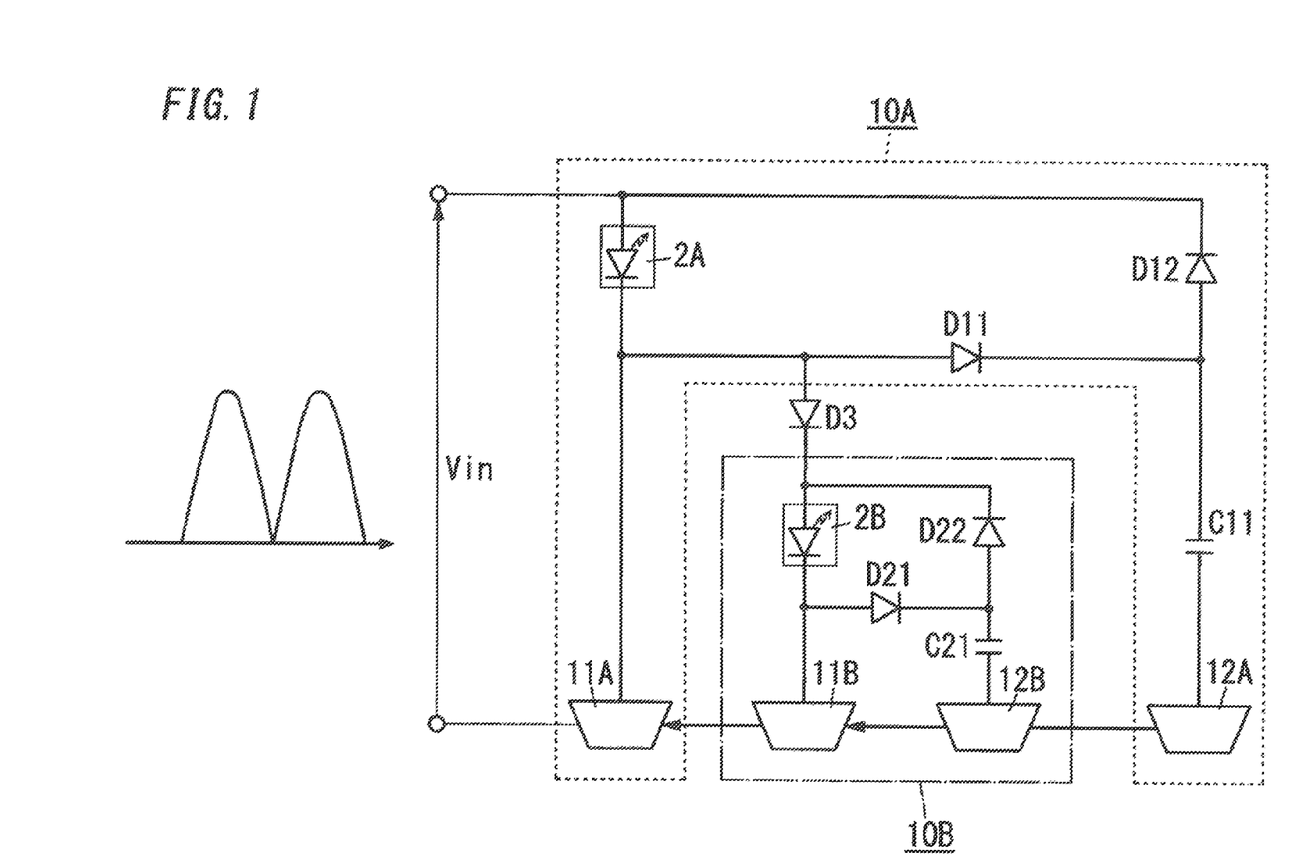
FIG. 1 is a circuit block diagram of a lighting device and an illumination device according to an embodiment.
Figure 2:
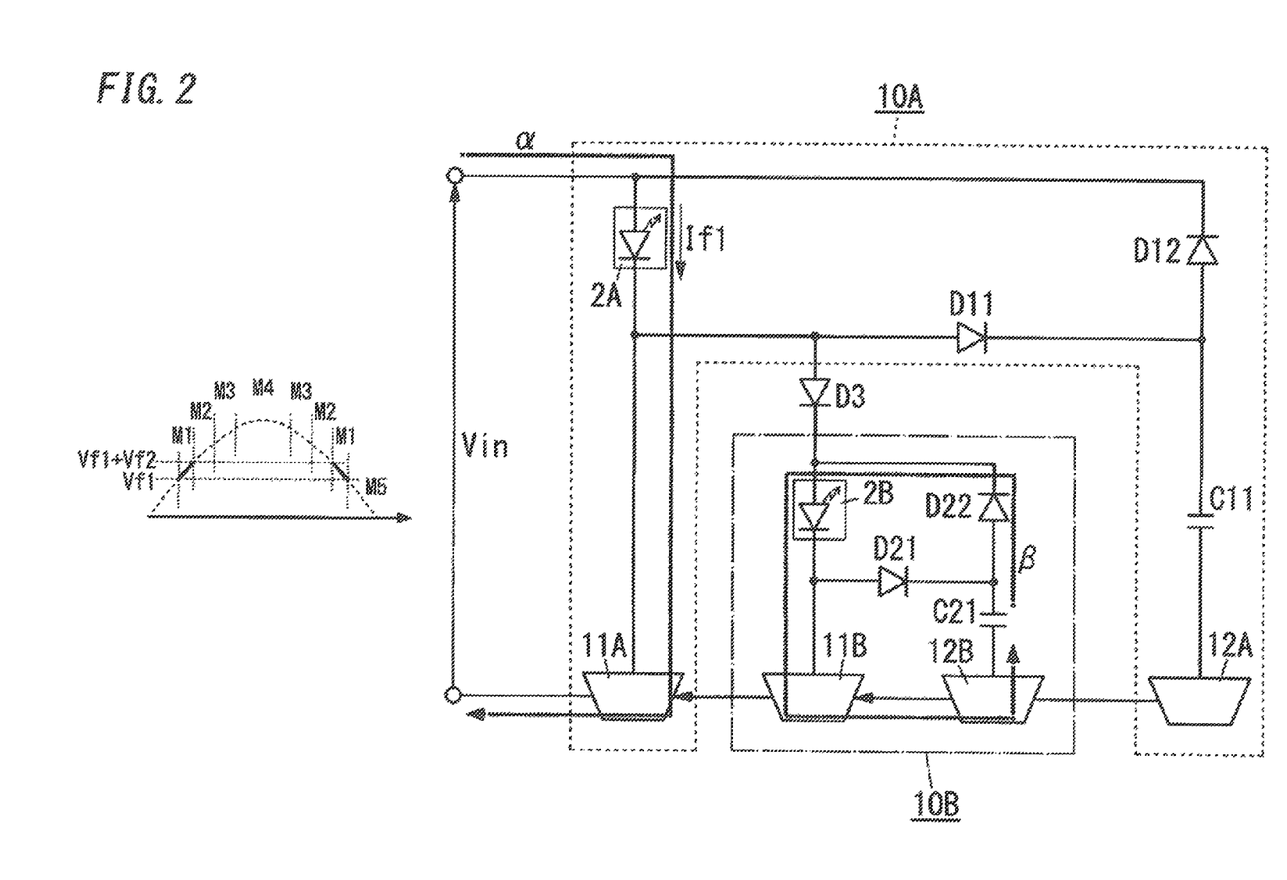
FIG. 2 is a circuit block diagram for describing an operation mode (first mode) of the lighting device and the illumination device.
Figure 3:
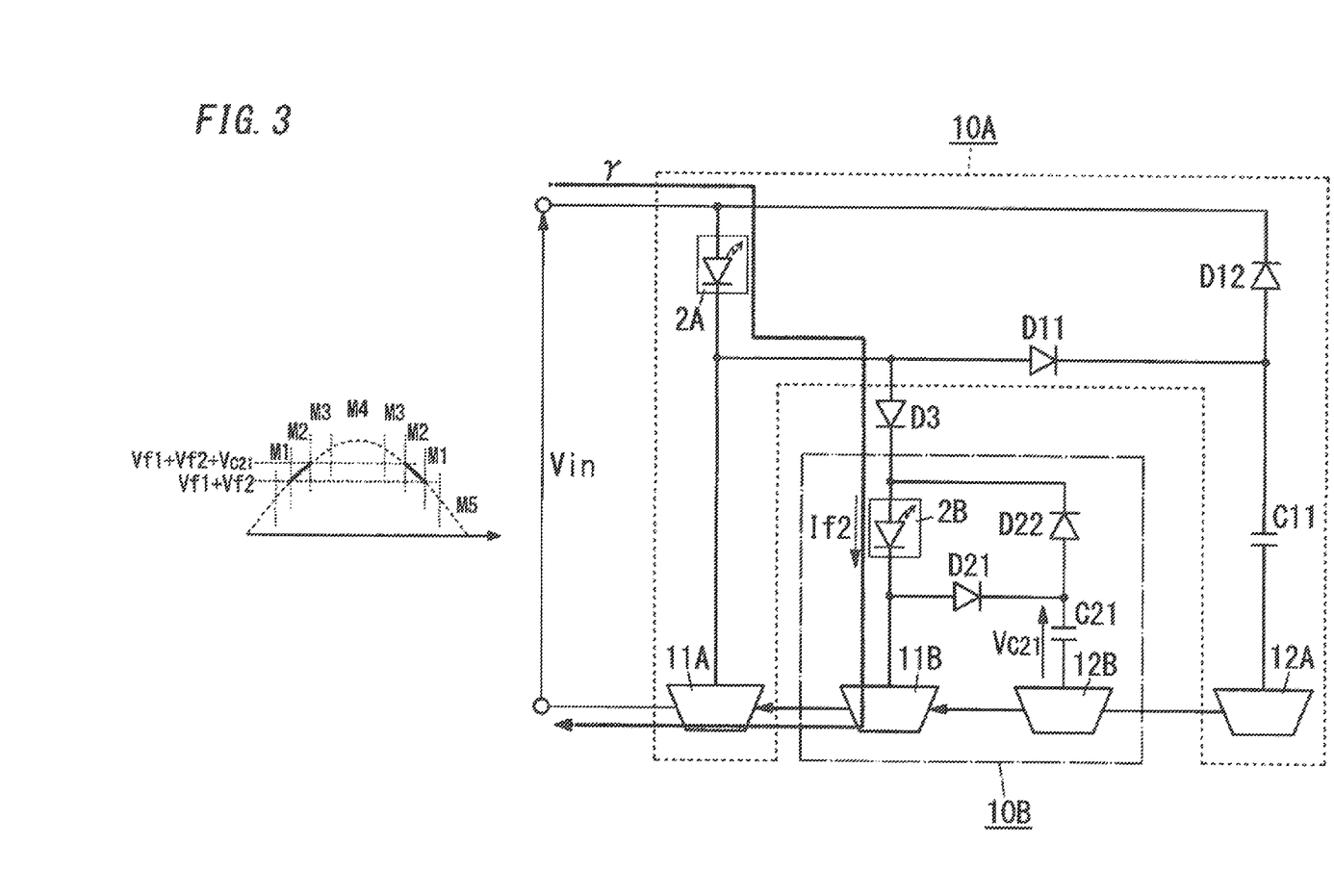
FIG. 3 is a circuit block diagram for describing an operation mode (second mode) of the lighting device and the illumination device.
Figure 4:
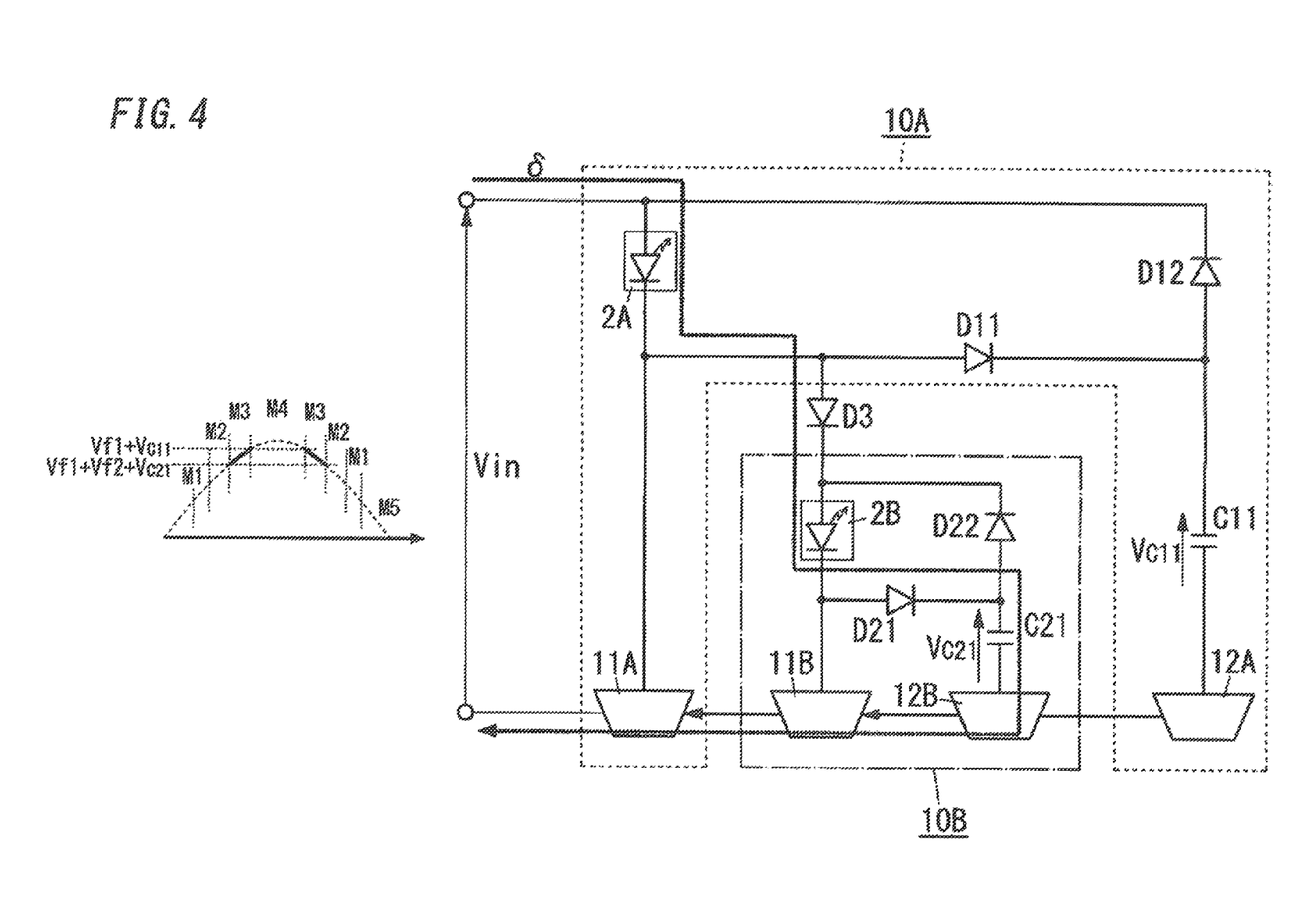
FIG. 4 is a circuit block diagram for describing an operation mode (third mode) of the lighting device and the illumination device.
Figure 5:
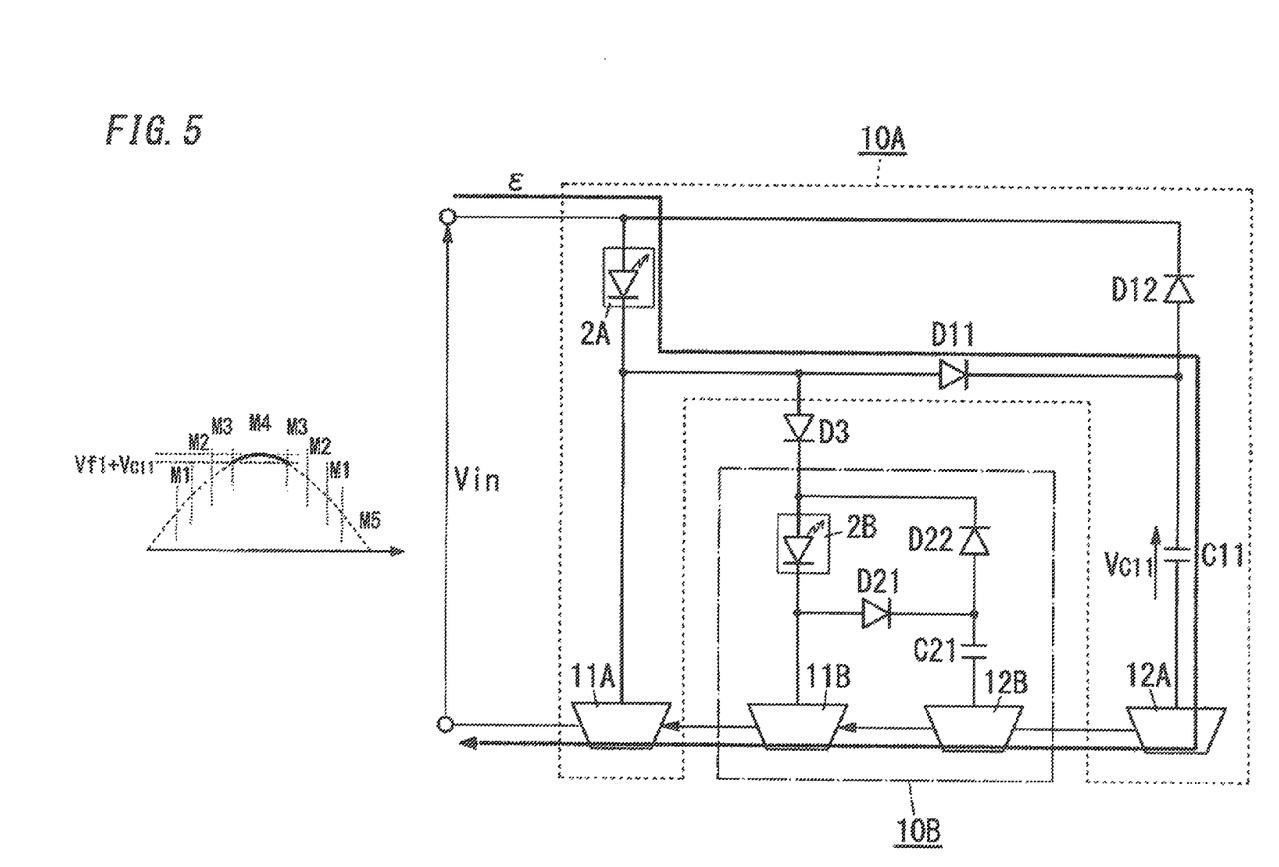
FIG. 5 is a circuit block diagram for describing an operation mode (fourth mode) of the lighting device and the illumination device.
Figure 6:
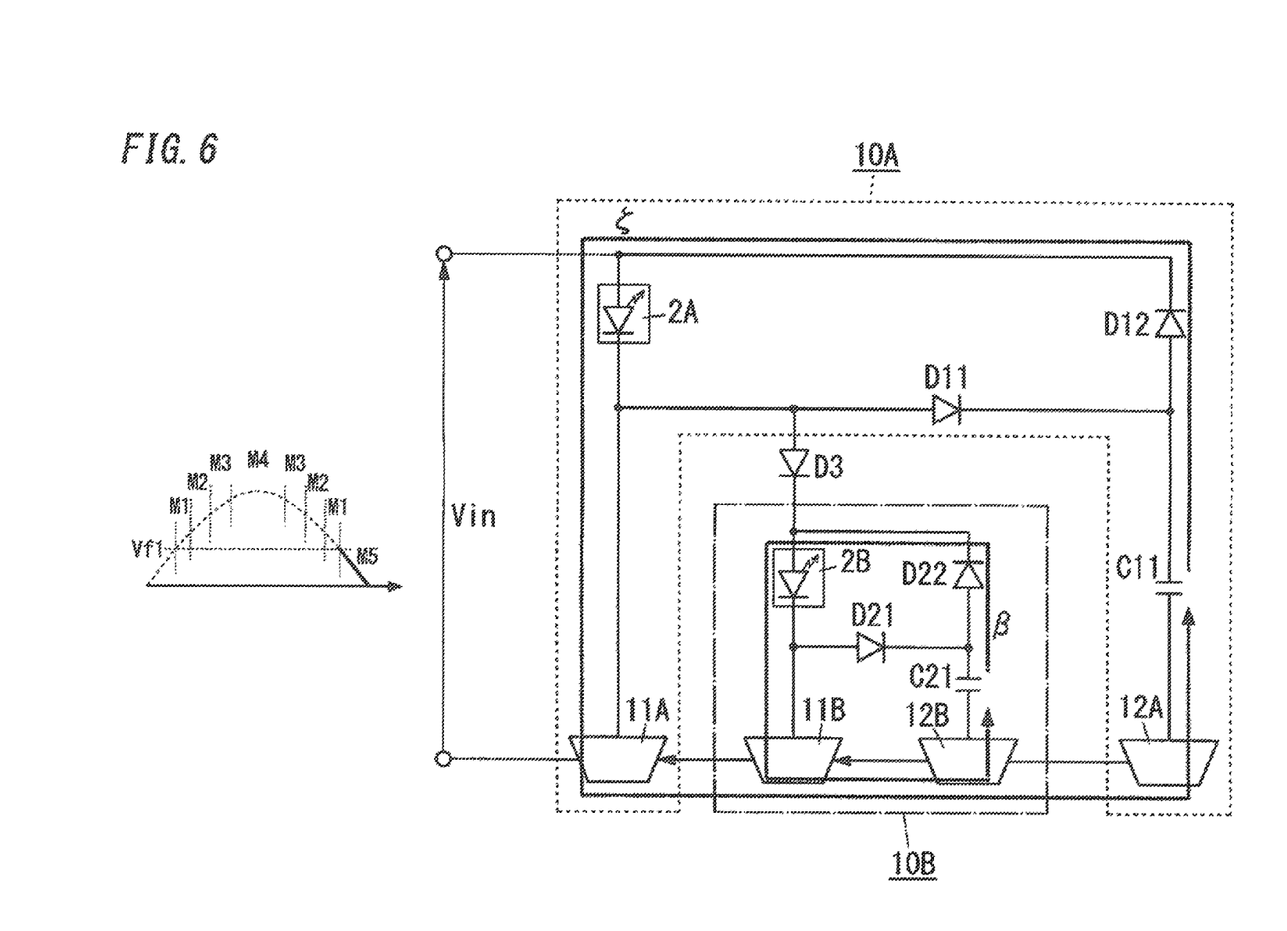
FIG. 6 is a circuit block diagram for describing an operation mode (fifth mode) of the lighting device and the illumination device.

The illumination device according to the present embodiment includes a lighting device and two light sources (first light source 2A and second light source 2B) as shown in FIG. 1. The first light source 2A and the second light source 2B each include a plurality of solid light emitting elements that are electrically connected to each other. In the present embodiment, light emitting diodes to emit white light are used as the solid light emitting elements. However, the solid light emitting elements are not limited to the light emitting diodes. The solid light emitting elements may be solid light emitting elements other than the light emitting diodes, such as organic electro luminescence elements. Also, light emitting diodes constituting the first light source 2A may have a color of light different from a color of light of light emitting diodes constituting the second light source 2B.

The first light source 2A is configured to be conductive to emit light when a voltage equal to or more than a first reference voltage Vf1 is applied in a forward direction of the first light source 2A. Similarly, the second light source 2B is configured to be conductive to emit light when a voltage equal to or more than a second reference voltage Vf2 is applied to the second light source 2B in a forward direction of the second light source 2B. However, it is preferable that the first light source 2A is configured to have the first reference voltage Vf1 that is at least twice the second reference voltage Vf2 of the second light source 2B.

As shown in FIG. 1, the lighting device includes a first circuit block 10A and a second circuit block 10B. The first circuit block 10A includes a first current controller (first current control circuit) 11A, a first storage element C11, a first charging current controller (first charging current control circuit) 12A, a charging rectifier element D11, a discharging rectifier element D12. The first current controller 11A is electrically connected in series to the first light source 2A. The first current controller 11A is configured to control first current flowing through the first light source 2A such that the first current does not exceed a predetermined value. The first storage element C11 includes, for example, a capacitor such as an electrostatic capacitor, and is charged by current flowing through the first light source 2A. The first charging current controller 12A is configured to control current (the first charging current) for charging the first storage element C11. The charging rectifier element D11 includes a diode, and is inserted between the first light source 2A and the first storage element C11 such that an anode of the charging rectifier element D11 is electrically connected to the first light source 2A and a cathode of the charging rectifier element D11 is electrically connected to the first storage element C11. The discharging rectifier element D12 includes a diode. The discharging rectifier element D12 has an anode that is electrically connected to the first storage element C11. The discharging rectifier element D12 has a cathode that is electrically connected to the first light source 2A. That is, the discharging rectifier element D12 is configured to cause the current discharged from the first storage element C11 to flow through the first light source 2A. As shown in FIG. 1, the first circuit block 10A is configured such that a pulsating voltage Vin generated by the sine wave AC voltage being rectified is applied to the series circuit of the first light source 2A and the first current controller 11A.

The second circuit block 10B includes a second current controller (second current control circuit) 11B, a second storage element C21, a second charging current controller (second charging current control circuit) 12B, a charging rectifier element D21, and a discharging rectifier element D22. The second current controller 11B is electrically connected in series to the second light source 2B, and is configured to control a second current flowing through the second light source 2B such that the second current does not exceed a predetermined value. The second storage element C21 includes, for example, a capacitor such as an electrostatic capacitor, and is charged by current flowing through the second light source 2B. The second charging current controller 12B is configured to control current (second charging current) for charging the second storage element C21. The charging rectifier element D21 includes a diode, and is inserted between the second light source 2B and the second storage element C21 such that an anode of the charging rectifier element D21 is electrically connected to the second light source 2B and a cathode of the charging rectifier element D21 is electrically connected to the second storage element C21. The discharging rectifier element D22 includes a diode. The discharging rectifier element D22 has an anode that is electrically connected to the second storage element C21. The discharging rectifier element D22 has a cathode that is electrically connected to the second light source 2B. That is, the discharging rectifier element D22 is configured to cause current charged from the second storage element C21 to flow through the second light source 2B. The second light source 2B is electrically connected in series to the first light source 2A via the connection rectifier element D3. The connection rectifier element D3 that is the diode has an anode that is electrically connected to a connection point between the first light source 2A and the anode of the charging rectifier element D11 of the first circuit block 10A, and a cathode that is electrically connected to the second light source 2B. The second circuit block 10B is electrically connected in parallel to the first current controller 11A of the first circuit block 10A via the connection rectifier element D3. Note that, in the present embodiment, the charging rectifier elements D11 and D21, the discharging rectifier element D12 and D22, and the connection rectifier element D3 each include the diode, but the charging rectifier elements D11 and D21, the discharging rectifier elements D12 and D22, and the connection rectifier element D3 each are not limited to the diode.

Next, basic operations of the lighting device and the illumination device according to the present embodiment will be described with reference to circuit block diagrams of FIGS. 2 to 6.

The lighting device has five operation modes (first mode M1 to fifth mode M5). The first mode M1 is an operation mode when an input voltage (pulsating voltage) Vin is equal to or more than the first reference voltage Vf1 and less than the sum of the first reference voltage Vf1 and the second reference voltage Vf2. In the first mode M1, constant current (first current) If1 flows to the first light source 2A in a path that passes from the first light source 2A through the first current controller 11A of the first circuit block 10A, as shown by a broken line α in FIG. 2, and the first light source 2A is lighted. Additionally, in the first mode M1, as shown by a broken line β in FIG. 2, the discharge current of the second storage element C21 flows in a path that passes from the second storage element C21 through the discharging rectifier element D22, the second light source 2B, and the second storage element C21 in this order, and the second light source 2B is lighted.

Also, the second mode M2 is an operation mode when the input voltage Vin is equal to or more than the sum of the first reference voltage Vf1 and the second reference voltage Vf2, and less than the sum of the first reference voltage Vf1, the second reference voltage Vf2, and the voltage VC21 across the second storage element C21. In the second mode M2, constant current (second current) If2 flows in a path that passes from the first light source 2A through the connection rectifier element D3, the second light source 2B, and the second current controller 11B in this order, as shown by a broken line γ in FIG. 3, and the first light source 2A and the second light source 2B are lighted.

Furthermore, the third mode M3 is an operation mode when the input voltage Vin is equal to or more than the sum of the first reference voltage Vf1, the second reference voltage Vf2, and the voltage VC21 across the second storage element C21, and less than the sum of the first reference voltage Vf1 and the voltage VC11 across the first storage element C11. In the third mode M3, constant current (second charging current) flows in a path that passes from the first light source 2A through the connection rectifier element D3, the second light source 2B, the charging rectifier element D21, the second storage element C21, and the second charging current controller 12B in this order, as shown by a broken line δ in FIG. 4. The first light source 2A and the second light source 2B are lighted, and the second storage element C21 is charged, with the second charging current.

The fourth mode M4 is an operation mode when the input voltage Vin is equal to or more than the sum of the first reference voltage Vf1 and the voltage VC11 across the first storage element C11. In the fourth mode M4, current (first charging current) flows in a path that passes from the first light source 2A through the charging rectifier element D11 of the first circuit block 10A, the first storage element C11, and the first charging current controller 12A in this order, as shown by a broken line ε in FIG. 5. The first light source 2A is lighted, and the first storage element C11 is charged.

The fifth mode M5 is an operation mode when the input voltage Vin is less than the first reference voltage Vf1. In the fifth mode M5, discharge current (first discharge current) flows in Ha path that passes from the first storage element C11 through the discharging rectifier element D12 of the first circuit block 10A, the first light source 2A, and the first current controller 11A in this order, as shown by a broken line ζ in FIG. 6, and the first light source 2A is lighted. Also, in the fifth mode M5, second discharge current flows in a path that passes from the second storage element C21 through the discharging rectifier element D22 of the second circuit block 10B, the second light source 2B, and the second current controller 11B in this order, as shown by a broken line β in FIG. 6, and the second light source 2B is lighted.

As described above, the lighting device is configured to operate in operation modes in order of the fifth mode M5, the first mode M1, the second mode M2, the third mode M3, the fourth mode M4, the third mode M3, the second mode M2, the first mode, and the fifth mode, in one cycle of the input voltage Vin. The first circuit block 10A operates to charge the first storage element C11 in the fourth mode M4 and discharge the first storage element C11 in the fifth mode M5. The second circuit block 10B operates to charge the second storage element C21 in the third mode M3 and discharge the second storage element C21 in the first mode M1 and the fifth mode M5. That is, although being connected to only one light source (first light source 2A, second light source 2B), the first circuit block 10A and the second circuit block 10B each can operate at the substantially same efficiency as the case of being connected to two light sources. Therefore, in the lighting device according to the present embodiment, efficiency can be improved without increasing the number of light sources compared with the conventional example described in Document 1.

Next, a circuit configuration of a lighting device 1 according to the present embodiment will be described in detail with reference to FIG. 7.

The lighting device 1 preferably includes a rectifier 6 that full-wave rectifies AC voltage and AC current provided from an AC power supply 3. The rectifier 6 is constituted by a diode bridge. It is preferable that the AC power supply 3 is electrically connected between a pair of AC input terminals of the rectifier 6 via a fuse 4. Also, it is preferable that a surge absorbing element 5 such as a varistor is electrically connected between the AC input terminals of the rectifier 6.

The AC power supply 3 supplies a sine wave AC voltage having an effective value of 220 [V], for example. Accordingly, a sine wave pulsating voltage (input voltage Vin) having a maximum value (peak value) of $220 \times \sqrt{2} \approx 311$ [V] is outputted from the DC output terminals of the rectifier 6.

The first light source 2A is preferably constituted by a series circuit of a plurality of surface mount device (SMD) or chip on board (COB) light-emitting diodes. Also, it is preferable that a capacitor C12 for smoothing is electrically connected in parallel to the first light source 2A. It is preferable that the first reference voltage Vf1 is set to one-half or less of the maximum value of the input voltage Vin, and 127 [V], for example. That is to say, the first light source 2A includes a series circuit of n (n is a natural number) light-emitting diodes, where n is a minimum number that satisfies the following relationship: forward voltage of one light-emitting diode× n≤127 [V]. It is preferable that the first light source 2A is constituted by a series circuit of forty-one light-emitting diodes having the forward voltage of 3.1 [V], for example.

Similarly, the second light source 2B is preferably constituted by a series circuit of a plurality of SMD type or COB type light-emitting diodes. Also, it is preferable that a capacitor C22 for smoothing is electrically connected in parallel to the second light source 2B. It is preferable that the second reference voltage Vf2 is set to one-half or less of the first reference voltage Vf1, and 50 [V], for example. That is to say, the second light source 2B includes a series circuit of m (m is a natural number) light-emitting diodes, where m is the minimum number that satisfies the following relationship: forward voltage of one light-emitting diode×m≤50 [V]. It is preferable that the second light source 2B is constituted by a series circuit of sixteen light-emitting diodes having the forward voltage of 3.1 [V], for example.

Figure 7:
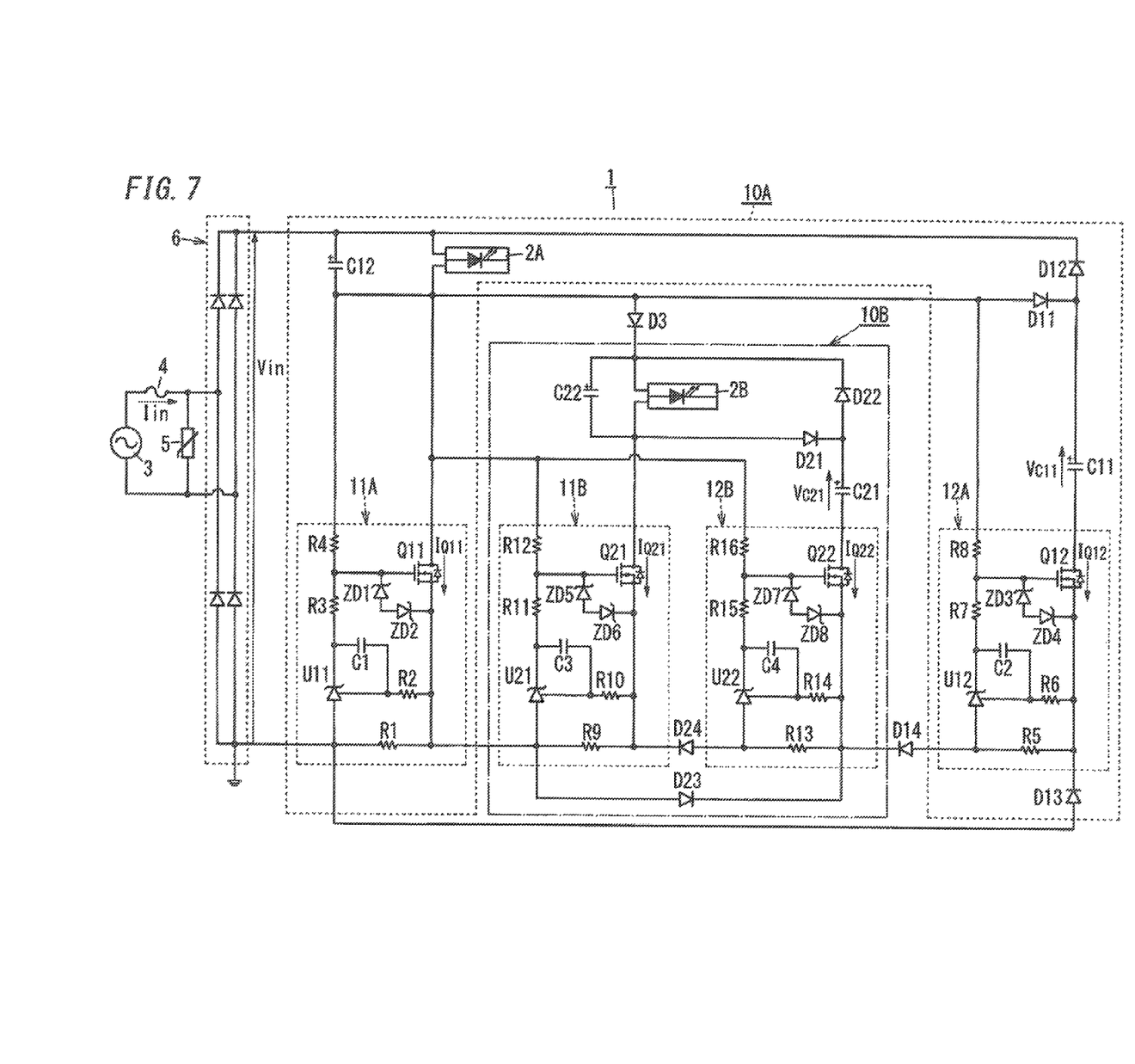
FIG. 7 is a circuit configuration diagram of the lighting device and the illumination device.

The first current controller 11A is configured by a constant current circuit using the transistor Q11 and the shunt regulator U11 (refer to FIG. 7). The transistor Q11 is constituted by an n-channel MOSFET (metal-oxide-semiconductor field-effect transistor), for example. However, the transistor Q11 may be constituted by a pnp-type bipolar transistor, for example.

A drain of the transistor Q11 is electrically connected to the first light source 2A, and a source of the transistor Q11 is electrically connected to a resistor R1, a resistor R2, and a cathode of a Zener diode ZD2. A cathode of the shunt regulator U11 is electrically connected to a first end of a resistor R3 and a first end of a capacitor C1, an anode of the shunt regulator U11 is electrically connected to a first end of the resistor R1 and a low-potential DC output terminal of the rectifier 6. Also, a reference terminal of the shunt regulator U11 is electrically connected to a second end of the capacitor C1 and a first end of the resistor R2.

The resistor R4 is a resistor for biasing the gate of the transistor Q11. Because the first end of the resistor R4 is electrically connected to the capacitor C12 of the first light source 2A, the gate of the transistor Q11 is always pulled up to a voltage that is higher than the drain voltage, and a period during which current flows in the first light source 2A can be lengthened. Note that the resistor R3 and the capacitor C1 constitute a filter circuit (phase compensation circuit) for reducing oscillation of the shunt regulator U11. A resistance of the resistor R2 and a capacitance of the capacitor C1 are respectively set to 2 [kΩ] and 1 [nF] to set a cut-off frequency of the filter circuit to 100 [kHz] or less.

The first current controller 11A controls (to be constant current) a drain current of the transistor Q11 by increasing or decreasing a cathode current (gate voltage) such that a voltage (voltage drop) generated across the resistor R1 matches a reference voltage of the shunt regulator U11. The reference voltage of the shunt regulator U11 is 1.24 V, for example. If a resistance of the resistor R1 is 8.9 Ω, the shunt regulator U11 controls the transistor Q11 such that a current (=140 [mA]) flows that causes the voltage across the resistor R1 to be 1.24 V.

Also, a series circuit of two Zener diodes ZD1 and ZD2 is electrically connected between the gate and source of the transistor Q11. With these Zener diodes ZD1 and ZD2, the voltage between the gate and source of the transistor Q11 is restricted, and the shunt regulator U11 is protected such that the voltage between the cathode and anode of the shunt regulator U11 does not exceed a maximum rated voltage.

The first charging current controller 12A is constituted by, similarly to the first current controller 11A, a constant current circuit using the transistor Q12 and the shunt regulator U12 (refer to FIG. 7). Note that the circuit configuration of the first charging current controller 12A is in common with that of the first current controller 11A, except that the reference signs added to respective elements are different. Therefore, detailed description of the first charging current controller 12A will be omitted.

Also, the second current controller 11B is constituted by, similarly to the first current controller 11A, a constant current circuit using the transistor Q21 and the shunt regulator U21 (refer to FIG. 7). The second charging current controller 12B is also constituted by, similarly to the first current controller 11A, a constant current circuit using the transistor Q22 and the shunt regulator U22 (refer to FIG. 7). Note that the circuit configurations of the second current controller 11B and the second charging current controller 12B is in common with that of the first current controller 11A, except that the reference signs added to respective elements are different. Therefore, detailed description of the second current controller 11B and the second charging current controller 12B will be omitted.

Here, the low-potential DC output terminal of the rectifier 6 is electrically connected to the resistor R1 of the first current controller 11A, the resistor R9 of the second current controller 11B, the resistor R13 of the second charging current controller 12B, and the resistor R5 of the first charging current controller 12A (refer to FIG. 7). A diode D14 is inserted between the resistor R5 and the resistor R13, a diode D24 is inserted between the resistor R13 and the resistor R9. The two diodes D14 and D24 are inserted such that current flows in a direction from the first charging current controller 12A to the low-potential DC output terminal of the rectifier 6. Furthermore, a connection point of the resistor R1 and the low-potential DC output terminal of the rectifier 6 is electrically connected to the anode of the diode D13, and the source of the transistor Q12 of the first charging current controller 12A is electrically connected to the cathode of the diode D13. That is to say, the first circuit block 10A has a path in which current flows from the first current controller 11A to the first charging current controller 12A. Similarly, a connection point of the resistor R9 and the resistor R1 is electrically connected to an anode of the diode D23, and the source of the transistor Q22 of the second charging current controller 12B is electrically connected to a cathode of the diode D23. That is to say, the second circuit block 10B has a path in which current flows from the second current controller 11B to the second charging current controller 12B.

Incidentally, the first current controller 11A, the second current controller 11B, the first charging current controller 12A, and the second charging current controller 12B operate while influencing each other. That is, not only the output current of the first current controller 11A but also the output currents of the first charging current controller 12A, the second current controller 11B, and the second charging current controller 12B flow in the resistor R1 of the first current controller 11A. That is, as a result of output currents of the first charging current controller 12A, the second current controller 11B, and the second charging current controller 12B increasing and the voltage across the resistor R1 increasing, the output current of the first current controller 11A decreases. Then, when the voltage drop in the resistor R1 (voltage across the resistor R1) due to the output currents of the first charging current controller 12A, the second current controller 11B, and the second charging current controller 12B reaches the reference voltage of the shunt regulator U11, the first current controller 11A stops operation.

Similarly, the output currents of the first charging current controller 12A and the second charging current controller 12B flow in the resistor R9 of the second current controller 11B. That is, as a result of the output current of the first charging current controller 12A and the second charging current controller 12B increasing and the voltage across the resistor R9 increasing, the output current of the second current controller 11B decreases. Then, when the voltage drop in the resistor R9 (voltage across the resistor R9) due to the output current of the first charging current controller 12A and the second charging current controller 12B reaches the reference voltage of the shunt regulator U21, the second current controller 11B stops operation. Similarly, when the voltage drop in the resistor R13 (voltage across the resistor R13) due to the output current of the first charging current controller 12A reaches the reference voltage of the shunt regulator U22, the second charging current controller 12B stops operation.

Figure 8:
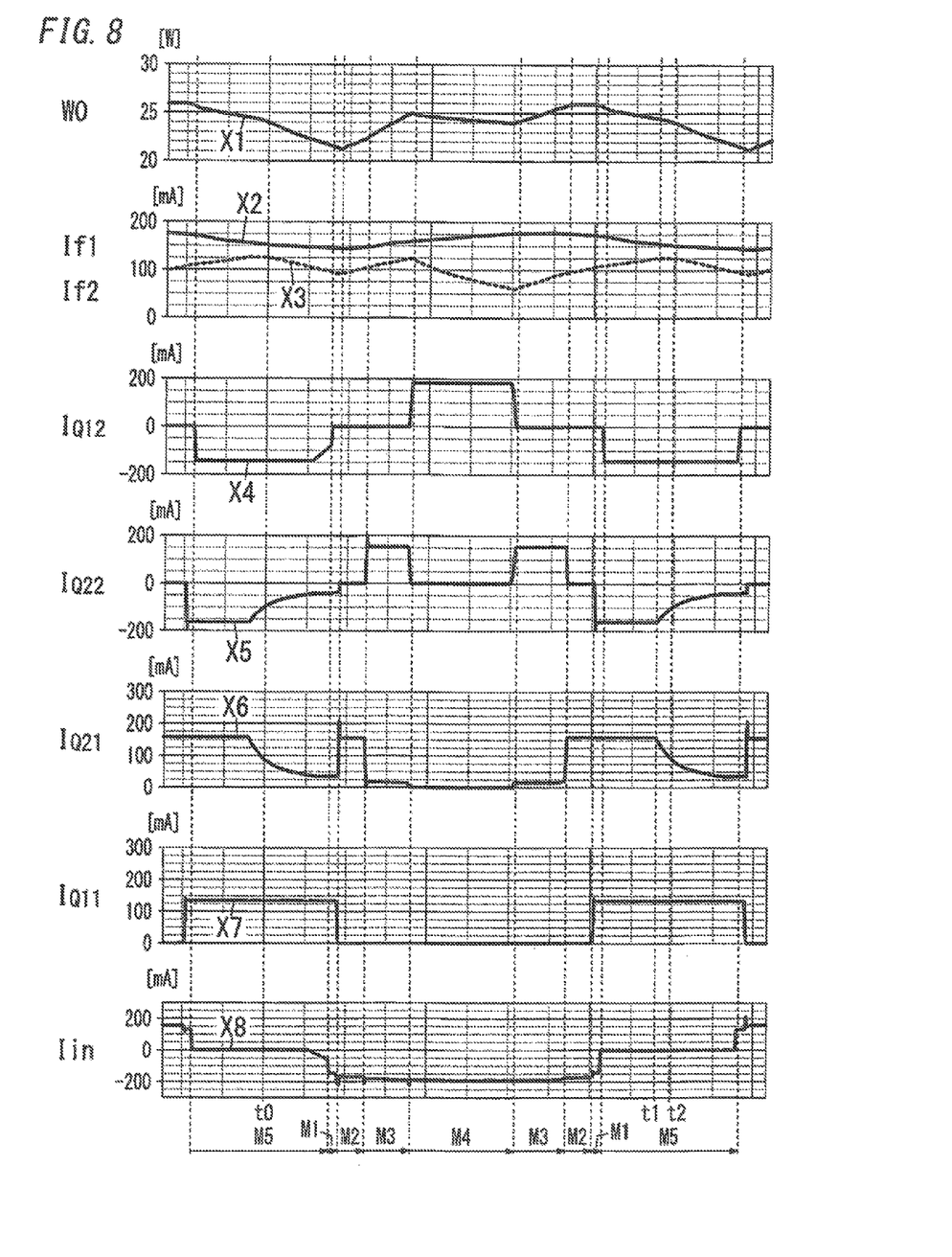
FIG. 8 is a time chart for describing operations of the lighting device and the illumination device.

Next, operations of the lighting device 1 and the illumination device according to the present embodiment will be described, with reference to the circuit block diagram of FIG. 7 and the time chart of FIG. 8. In FIG. 8, a solid line X1 indicates power (supply power) WO supplied to the first light source 2A and the second light source 2B. Also, a solid line X2 indicates the first current If1 through the first light source 2A, and a broken line X3 indicates the second current If2 through the second light source 2B. Furthermore, a solid line X4 and a solid line X5 respectively indicate the drain current IQ12 of the transistor Q12 of the first charging current controller 12A and the drain current IQ22 of the transistor Q22 of the second charging current controller 12B. Also, a solid line X6 and a solid line X7 respectively indicate the drain current of the transistor Q21 of the second current controller 11B and the drain current IQ11 of the transistor Q11 of the first current controller 11A. Furthermore, a solid line X8 indicates an input current Iin flowing from the AC power supply 3 to the rectifier 6. Also, in FIG. 8, the time t=t0 and the time t=t2 in a horizontal axis correspond to a zero-crossing point of the supply voltage of the AC power supply 3. That is, the time period t=t0 to t2 corresponds to one cycle of the input voltage Vin (negative half cycle of the supply power of the AC power supply 3).

Near the time t=t0, because the input voltage Vin is smaller than the voltage VC11 across the first storage element C11, the input current Iin does not flow (refer to the solid line X8 in FIG. 8). Also, because the input voltage Vin is smaller than the first reference voltage Vf1, the lighting device 1 operates in the fifth mode M5. That is, the first circuit block 10A causes discharge current to flow in a path that passes from the first storage element C11 through the discharging rectifier element D12, the first light source 2A, the first current controller 11A (the transistor Q11, the resistor R1), the diode D13, a parasitic diode of the transistor Q12, and the first storage element C11 in this order. Note that the discharge current is to be a constant current by the first current controller 11A. Also, the second circuit block 10B causes discharge current to flow in a path that passes from the second storage element C21 through the discharging rectifier element D22, the second light source 2B, the second current controller 11B (the transistor Q21, the resistor R9), the diode D23, a parasitic diode of the transistor Q22, and the second storage element C21 in this order. Note that the discharge current is to be a constant current by the second current controller 11B. Therefore, the drain current IQ11 of the transistor Q11 and the drain current IQ21 of the transistor Q21 flow in a positive direction (refer to the solid line X7 and the solid line X6 in FIG. 8). On the other hand, the drain current IQ12 of the transistor Q12 and the drain current IQ22 of the transistor Q22 flow via a parasitic diode in a negative direction (refer to the solid line X4 and the solid line X5 in FIG. 8).

When the input voltage Vin increases and exceeds the voltage VC11 across the first storage element C11, the input current Iin start flowing (refer to the solid line X8 in FIG. 8). Furthermore, when the input voltage Vin is equal to or more than the first reference voltage Vf1, the lighting device 1 operates in the first mode M1. That is, the first circuit block 10A causes the first current If1 to flow through the first light source 2A in a path that passes from a high-potential DC output terminal of the rectifier 6 through the first light source 2A, the first current controller 11A, and the low-potential DC output terminal of the rectifier 6 in this order (refer to the solid line X2 in FIG. 8). In this time, the drain current IQ11 of the transistor Q11 is constant, and the drain current IQ12 of the transistor Q12 is zero (refer to the solid line X7 and the solid line X4 in FIG. 8). Also, the second circuit block 10B causes the discharge current to continue to flow in a path that passes from the second storage element C21 through the discharging rectifier element D22, the second light source 2B, the second current controller 11B, (the transistor Q21, the resistor R9), the diode D23, the parasitic diode of the transistor Q22, and the second storage element C21 in this order (refer to the solid line X6 and the solid line X5 in FIG. 8).

When the input voltage Vin is equal to or more than the sum of the first reference voltage Vf1 and the second reference voltage Vf2, the lighting device 1 operates in the second mode M2. In the second mode M2, the second current controller 11B of the second circuit block 10B operates, and the first current controller 11A of the first circuit block 10A stops operation (refer to the solid line X7 in FIG. 8). Therefore, current flows in a path that passes from the high-potential DC output terminal of the rectifier 6 through the first light source 2A, the connection rectifier element D3, the second light source 2B, the second current controller 11B, the low-potential DC output terminal of the rectifier 6 in this order. This current is to be a constant current by the second current controller 11B.

When the input voltage Vin is equal to or more than the sum of the first reference voltage Vf1, the second reference voltage Vf2, and the voltage VC21 across the second storage element C21, the lighting device 1 operates in the third mode M3. In the third mode M3, the second charging current controller 12B of the second circuit block 10B operates, and the second current controller 11B stops operation. Therefore, current flows in a path that passes from the high-potential DC output terminal of the rectifier 6 through the first light source 2A, the connection rectifier element D3, the second light source 2B, the charging rectifier element D21, the second storage element C21, the second charging current controller 12B, and the low-potential DC output terminal of the rectifier 6 in this order. This current is to be a constant current by the second charging current controller 12B.

When the input voltage Vin is equal to or more than the sum of the first reference voltage Vf1 and the voltage VC11 across the first storage element C11, the lighting device 1 operates in the fourth mode M4. That is, the first circuit block 10A causes current to flow in a path that passes from the high-potential DC output terminal of the rectifier 6 through the first light source 2A, the charging rectifier element D11, the first storage element C11, the first charging current controller 12A, and the low-potential DC output terminal of the rectifier 6 in this order. This current is to be a constant current by the first charging current controller 12A. On the other hand, the first current controller 11A and the second circuit block 10B stop operations. However, the second light source 2B is lighted by current discharged from the capacitor C22 (refer to the broken line X3 in FIG. 8). Here, when the second current controller 11B is set to cause current of 150 [mA] to flow, an equivalent resistance RL2 of the second light source 2B satisfies the following relationship: RL2=Vf2/150 [mA]=50 [V]/150 [mA]=333 [Ω]. For example, if the capacitance of the capacitor C22 is 100 [μF], the time constant τ when the current is discharged from the capacitor C22 to the second light source 2B satisfies the following relationship: τ=333 [Ω]×100 [μF]=33.3 [ms]. On the other hand, the duration time of the fourth mode M4 is about 2 [ms]. Therefore, the second light source 2B can continually light even in the fourth mode M4.

When the input voltage Vin is less than the sum of the first reference voltage Vf1 and the voltage VC11 across the first storage element C11 after reaching a peak, the lighting device 1 operates in the third mode M3. That is, the charge of the first storage element C11 due to the first charging current controller 12A stops (refer to the solid line X4 in FIG. 8), and the charge of the second storage element C21 due to the second charging current controller 12B starts (refer to the solid line X5 in FIG. 8).

When the input voltage Vin is less than the sum of the first reference voltage Vf1, the second reference voltage Vf2, and the voltage VC21 across the second storage element C21, the lighting device 1 operates in the second mode M2. That is, the charge of the second storage element C21 due to the second charging current controller 12B stops (refer to the solid line X5 in FIG. 8), and the second current controller 11B operates (refer to the solid line X6 in FIG. 8).

When the input voltage Vin is less than the sum of the first reference voltage Vf1 and the second reference voltage Vf2, the lighting device 1 operates in the first mode M1. That is, the second current controller 11B continues to operate (refer to the solid line X6 in FIG. 8), and the first current controller 11A starts operation (refer to the solid line X7 in FIG. 8).

When the input voltage Vin is less than the voltage VC11 across the first storage element C11, the input current Iin stops (refer to the solid line X8 in FIG. 8). Furthermore, when the input voltage Vin is less than the first reference voltage Vf1, the lighting device 1 operates in the fifth mode M5. Also, as a result of the voltage VC21 across the second storage element C21 decreasing and reaching the first reference voltage Vf1 (refer to the time t=t1 in FIG. 8), the second discharge current starts decreasing (refer to the solid line X6 in FIG. 8). However, because the discharge from the capacitor C22 to the second light source 2B is performed, the second current If2 keeps to be a constant value (refer to the broken line X3 in FIG. 8). Then, when the input voltage Vin exceeds a zero-crossing point (the time t=t2) and increases, the lighting device 1 operates to repeat in the first mode M1 to the fifth mode M5 in the above-described order.

Incidentally, when the lighting device 1 shifts from the first mode M1 to the fifth mode M5, a current that changes steeply may flow in the discharging rectifier element D12 of the first circuit block 10A. There is a possibility that the input current Iin changes rapidly due to the steep current, noise caused by the rapid change of the input current Iin leaks into the AC power supply 3. Therefore, in the lighting device 1 according to the present embodiment, it is preferable that the rapid change of the input current Iin is suppressed by the impedance element inserted between the discharging rectifier element D12 and the high-potential DC output terminal of the rectifier 6. Similarly, it is preferable that an impedance element is inserted between the discharging rectifier element D22 of the second circuit block 10B and the high-potential DC output terminal of the rectifier 6. Note that each impedance element is preferably a resistor or an inductor. More preferably, each impedance element is an inductor having lower loss.

Note that the lighting device 1 according to the present embodiment includes a circuit configuration in which the two circuit blocks 10A, 10B are nested inside one another. However, the lighting device 1 may include a circuit configuration in which three or more circuit blocks are nested inside one another. For example, a third circuit block may include the same circuit configuration as the first circuit block 10A and the second circuit block 10B, and may be electrically connected to the second current controller 11B of the second circuit block 10B via the connection rectifier element.

As described above, the lighting device 1 according to the present embodiment includes n (n is a positive integer of two or more) circuit blocks (first circuit block 10A and second circuit block 10B). In the lighting device 1, the n circuit blocks (first circuit block 10A and second circuit block 10B) are electrically connected to the n light sources (first light source 2A and second light source 2B), respectively, and configured to light the n light sources (first light source 2A and the second light source 2B). Each of the n circuit blocks (first circuit block 10A or the second circuit block 10B) includes the current controller (first current controller 11A or second current controller 11B), the storage element (first storage element C11 or second storage element C21). Each of the n circuit blocks (first circuit block 10A or second circuit block 10B) includes the charging current controller (first charging current controller 12A or second charging current controller 12B), the charging rectifier element D11 or D21, the discharging rectifier element D12 or D22. The current controller (first current controller 11A or second current controller 11B) is electrically connected to the respective light source (first light source 2A or second light source 2B) of the n light sources (first light source 2A and second light source 2B). The current controller is configured to control the current (first current If1 or second current If2) flowing through the respective light source (first light source 2A or second light source 2B) such that the current (first current If1 or second current If2) exceeds a predetermined value. The storage element (first storage element C11 or second storage element C21) is charged by current flowing through the respective light source (first light source 2A or second light source 2B). The charging current controller (first charging current controller 12A or second charging current controller 12B) is configured to control the current for charging the storage element (first storage element C11 or second storage element C21). The charging rectifier element D11 or D21 is inserted between the respective light source (first light source 2A or second light source 2B) and the storage element (first storage element C11 or second storage element C21). The discharging rectifier element D12 or D22 is configured to cause the current discharged from the storage element (first storage element C11 or second storage element C21) to flow through the respective light source (first light source 2A or second light source 2B). The first circuit block 10A of the n circuit blocks is configured such that the pulsating voltage (input voltage Vin) generated by the sine wave AC voltage being rectified is applied to the series circuit of the current controller (first current controller 11A) and the respective light source (first light source 2A) electrically connected to the first circuit block. The i-th circuit block (second circuit block 10B) of the n circuit blocks is electrically connected to the current controller (first current controller 11A) of the i-1 -th circuit block (first circuit block 10A) of the n circuit blocks via the i-1-th connection rectifier element D3.

The lighting device 1 according to the present embodiment includes the circuit configuration in which the plurality of circuit blocks (first circuit block 10A and second circuit block 10B) are nested inside one another. Each of the circuit blocks includes the current controller (first current controller 11A or second current controller 11B), the storage element (first storage element C11 or second storage element C21), and the charging current controller (first charging current controller 12A or second charging current controller 12B). Each of the circuit blocks is configured to charge the storage element with the current flowing through the respective light source (first light source 2A or second light source 2B), and light each light source (first light source 2A or second light source 2B) with the discharge current of the storage element. Accordingly, each circuit block can operate at the substantially same efficiency (power supply efficiency) as the case of lighting two light sources. Therefore, in the lighting device 1 according to the present embodiment, efficiency can be improved without increasing the number of light sources compared with the conventional example described in Document 1.

In the lighting device 1 according to the present embodiment, it is preferable that the n circuit blocks include the two circuit blocks of the first circuit block 10A and the second circuit block 10B. The first circuit block 10A is preferably includes the first current controller 11A, the first storage element C11, the first charging current controller 12A, the charging rectifier element D11 of the first circuit block 10A, and the discharging rectifier element D12 of the second circuit block 10B. The first current controller 11A is electrically connected to the first light source 2A of the n light sources and configured to control the first current If1 flowing through the first light source 2A such that the first current If1 does not exceed the predetermined value. The first storage element C11 is preferably charged with the first current If1 flowing through the first light source 2A. The first charging current controller 12A is preferably configured to control the current for charging the first storage element C11. The charging rectifier element D11 is preferably inserted between the first light source 2A and the first storage element C11. The discharging rectifier element D12 is preferably configured to cause the current discharged from the first storage element C11 to flow through the first light source 2A. The second circuit block 10B preferably includes the second current controller 11B, the second storage element C21, the second charging current controller 12B, the charging rectifier element D21 of the second circuit block 10B, and the discharging rectifier element D22 of the second circuit block 10B. The second current controller 11B is preferably electrically connected to the second light source 2B. The second current controller 11B is preferably configured to control the second current If2 flowing through the second light source 2B such that the second current If2 does not exceed the predetermined value. The second storage element C21 is preferably charged with the second current If2 flowing through the second light source 2B. The second charging current controller 12B is preferably control the current for charging the second storage element C21. The charging rectifier element D21 is preferably inserted between the second light source 2B and the second storage element C21. The discharging rectifier element D22 is preferably configured to cause the current discharged from the second storage element C21 to flow through the second light source 2B. The first circuit block 10A is preferably configured such that the pulsating voltage (input voltage Vin) generated by the sine wave AC voltage being rectified is applied to the series circuit of the first light source 2A and the first current controller 11A. Preferably, the second circuit block 10B is electrically connected in parallel to the first current controller 11A of the first circuit block 10A via the first connection rectifier element D3 that corresponds to the first circuit block 10A.

If the lighting device 1 according to the present embodiment is configured as described above, efficiency can be improved compared with the conventional example described in Document 1 without increasing the number of light sources.

Furthermore, in the lighting device 1 according to the present embodiment, each of the n circuit blocks (first circuit block 10A and second circuit block 10B) preferably includes the impedance element. The impedance element is preferably inserted on the path in which the discharge current of the storage element (first storage element C11 or second storage element C21) flows.

If the lighting device 1 according to the present embodiment is configured as described above, it is possible that the rapid change of the input current Iin is suppressed by the impedance element. Accordingly, it is possible to reduce a higher harmonic component of the input current Iin.

Figure 9:
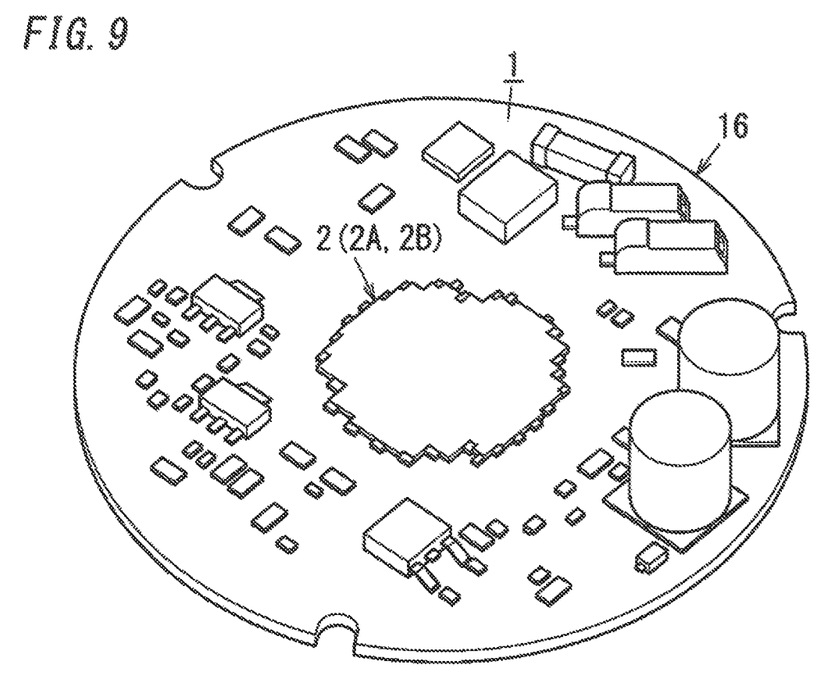
FIG. 9 is a perspective view of the lighting device and the illumination device.

Incidentally, the lighting device 1 according to the present embodiment may be integrally configured with the light sources 2 (first light source 2A and second light source 2B), as shown in FIG. 9. For example, it is preferable that the first light source 2A and the second light source 2B are mounted at a central portion of one surface (mounting surface) of a mounting substrate 16 shaped like a disk, and various circuit components that constitute the lighting device 1 are preferably mounted around the first light source 2A and the second light source 2B on the mounting surface. If an illumination device is configured by mounting the light source and the lighting device 1 on one mounting substrate 16, as described above, the illumination device can be miniaturized compared with a case where the light source and the lighting device 1 are configured separately.

As described above, the illumination device according to the present embodiment includes the n light sources 2 (first light source 2A and second light source 2B) and the lighting device 1. The n light sources 2 (first light source 2A and second light source 2B) each are constituted by one or more solid-state light-emitting elements.

The illumination device according to the present embodiment is constituted as described above, and efficiency can be improved compared with the conventional example described in Document 1 without increasing the number of light sources.

Also, in the illumination device according to the present embodiment, the n light sources 2 (first light source 2A and second light source 2B) is preferably configured to satisfy the following condition. A lighting start voltage (first reference voltage Vf1) is defined as a voltage with which the i-1-th light source (first light source 2A) of the n light sources 2 (first light source 2A and second light source 2B) is lighted, which is lighted by the i-1-th circuit block (first circuit block 10A) of the n circuit blocks (first circuit block 10A and second circuit block 10B). Also, a lighting start voltage (second reference voltage Vf2) is defined as a voltage with which the i-th light source (second light source 2B) of the n light sources 2 (first light source 2A and second light source 2B) is lighted, which is lighted by the i-th circuit block (second circuit block 10B) of the n circuit blocks (first circuit block 10A and second circuit block 10B). The condition is preferably configured such that the first reference voltage Vf1 is one-half or less of the second reference voltage Vf2.

Figure 10A:
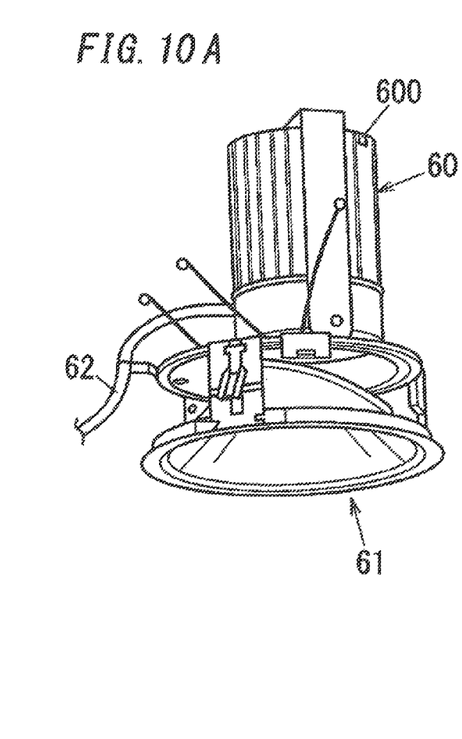
FIGS. 10A to 10C are perspective views of lighting fixtures according to the embodiment.

Finally, a lighting fixture according to the present embodiment will be described in detail with reference to FIGS. 10A to 10C. The lighting fixture according to the present embodiment is preferably configured as a down light that is provided to be buried in a ceiling, as shown in FIG. 10A, for example. The lighting fixture includes a reflector 61 and a fixture body 60 that houses light sources (first light source 2A and second light source 2B) and the illumination device including the lighting device 1. A plurality of radiation fins 600 are provided in an upper portion of the fixture body 60. A power cable 62 that is led out from the fixture body 60 is electrically connected to the AC power supply 3.

Figure 10B:
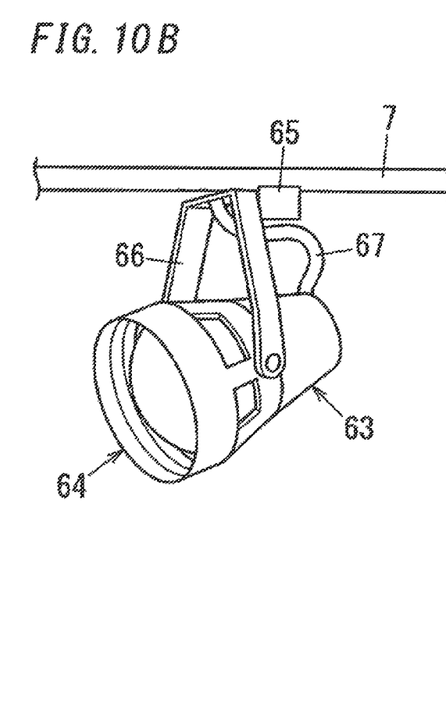
Figure 10C:
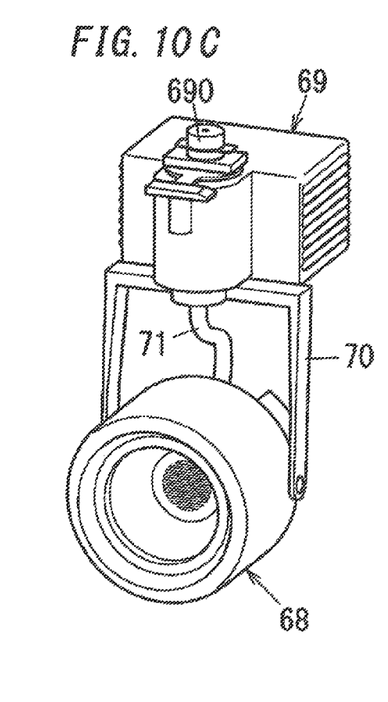

Alternatively, the lighting fixture according to the present embodiment may be preferably configured as a spot light to be attached to a wiring duct 7, as shown in FIGS. 10B and 10C. A lighting fixture shown in FIG. 10B includes: a fixture body 63 that houses light sources (first light source 2A and second light source 2B) and an illumination device including the lighting device 1; a reflector 64; a connector portion 65 that is attached to a wiring duct 7; and an arm portion 66 that couples the connector portion 65 and the fixture body 63. The connector portion 65 and the lighting device 1 are electrically connected via the power cable 67.

On the other hand, a lighting fixture shown in FIG. 10C includes: a fixture body 68 that houses a light source; a box 69 that houses a lighting device 1; a connection portion 70 that connects the fixture body 68 and the box 69; and a power cable 71 that electrically connects the light source and the lighting device 1. Note that a connector portion 690 that is to be electrically and mechanically connected to the wiring duct 7 in a detachable manner is provided on an upper surface of the box 69.

As described above, the lighting fixture according to the present embodiment includes the illumination device (first light source 2A, second light source 2B, and lighting device 1) and the fixture body 60 (fixture body 63 or fixture body 68) that holds the illumination device.

Because the lighting fixture according to the present embodiment is configured as described above, efficiency can be improved compared with the conventional example described in Document 1 without increasing the number of light sources.

The invention claimed is:

1. A lighting device, comprising n circuit blocks that are electrically connected to n light sources, respectively and configured to light the n light sources, where n is a positive integer of 2 or more wherein:
   each of the n circuit blocks includes:
      a current controller electrically connected in series to a respective light source of the n light sources, the current controller being configured to control current flowing through the respective light source such that the current does not exceed a predetermined value;
      a storage element configured to be charged with the current flowing through the respective light source;
      a charging current controller configured to control current for charging the storage element;
      a charging rectifier element inserted between the respective light source and the storage element; and
      a discharging rectifier element configured to cause current discharged from the storage element to flow through the respective light source,
   a first circuit block of the n circuit blocks being configured such that a pulsating voltage generated by a sine wave AC voltage being rectified is applied to a series circuit of the current controller and the respective light source that is electrically connected to the first circuit block, and
   for each value of i from 2 to n, where i is a positive integer, an i-th circuit block of the n circuit blocks being electrically connected in parallel to the current controller of an i-1-th circuit block of the n circuit blocks via an i-1-th connection rectifier element.

2. The lighting device according to claim 1, wherein:
   the n circuit blocks include a first circuit block and a second circuit block;
   the first circuit block includes
      a first current controller electrically connected in series to a first light source of the n light sources, the first current controller being configured to control the first current flowing through the first light source such that the first current does not exceed the predetermined value,
      a first storage element configured to be charged with the first current flowing through the first light source,
      a first charging current controller configured to control current for charging the first storage element,
      the charging rectifier element of the first circuit block, which is inserted between the first light source and the first storage element, and
      the discharging rectifier element of the first circuit block, which is configured to cause current discharged from the first storage element to flow through the first light source;
   the second circuit block includes
      a second current controller electrically connected in series to a second light source of the n light sources, the second current controller being configured to control the second current flowing through the second light source such that the second current does not exceed the predetermined value, a second storage element configured to be charged with the second current flowing through the second light source, a second charging current controller configured to control current for charging the second storage element, the charging rectifier element of the second circuit block, which is inserted between the second light source and the second storage element, and the discharging rectifier element of the second circuit block, which is configured to cause current discharged from the second storage element to flow through the second light source, the first circuit block being configured such that a pulsating voltage generated by the sine wave AC voltage being rectified is applied to a series circuit of the first light source and the first current controller, the second circuit block being electrically connected in parallel to the first current controller of the first circuit block via the first connection rectifier element.

3. An illumination device, comprising:
n light sources; and
the lighting device according to claim 2,
the n light sources each including one or more solid-state light-emitting elements.

4. A lighting fixture, comprising;
the illumination device according to claim 3; and
a fixture body holding the illumination device.

5. The illumination device according to claim 3, wherein the n light sources are configured such that a light start voltage of an i-1-th light source of the n light sources, which is lighted by an i-1-th circuit block of the n circuit blocks is one-half or less of a light start voltage of an i-th light source of the n light sources, which is lighted by an i-th circuit block of the n circuit blocks.

6. A lighting fixture, comprising;
the illumination device according to claim 5; and
a fixture body holding the illumination device.

7. The lighting device according to claim 2, wherein each of the n circuit blocks includes an impedance element inserted on a path in which discharge current of the storage element flows.

8. An illumination device, comprising:
n light sources; and
the lighting device according to claim 7,
the n light sources each including one or more solid-state light-emitting elements.

9. A lighting fixture, comprising;
the illumination device according to claim 8; and
a fixture body holding the illumination device.

10. The illumination device according to claim 8, wherein then n light sources are configured such that a light start voltage of an i-1-th light source of the n light sources, which is lighted by an i-1-th circuit block of the n circuit blocks is one-half or less of a light start voltage of an i-th light source of the n light sources, which is lighted by an i-th circuit block of the n circuit blocks.

11. A lighting fixture, comprising;
the illumination device according to claim 10; and
a fixture body holding the illumination device.

12. The lighting device according to claim 1, wherein each of the n circuit blocks includes an impedance element inserted on a path in which discharge current of the storage element flows.

13. An illumination device, comprising:
n light sources; and
the lighting device according to claim 12,
the n light sources each including one or more solid-state light-emitting elements.

14. The illumination device according to claim 13, wherein the n light sources are configured such that a light start voltage of an i-1-th light source of the n light sources, which is lighted by an i-1-th circuit block of the n circuit blocks is one-half of less of a light start voltage of an i-th light source of the n light sources, which is lighted by an i-th circuit block of the n circuit blocks.

15. A lighting fixture, comprising;
the illumination device according to claim 14; and
a fixture body holding the illumination device.

16. A lighting fixture, comprising;
the illumination device according to claim 13; and
a fixture body holding the illumination device.

17. An illumination device, comprising:
n light sources; and
the lighting device according to claim 1,
the n light sources each including one or more solid-state light-emitting elements.

18. A lighting fixture, comprising;
the illumination device according to claim 17; and
a fixture body holding the illumination device.

19. The illumination device according to claim 17, wherein the n light sources are configured such that a light start voltage of an i-1-th light source of the n light sources, which is lighted by an i-1-th circuit block of the n circuit blocks is one-half or less of a light start voltage of an i-th light source of the n light sources, which is lighted by an i-th circuit block of the n circuit blocks.

20. A lighting fixture, comprising;
the illumination device according to claim 19; and
a fixture body holding the illumination device.

* * * * *